(12) United States Patent
Sinha et al.

(10) Patent No.: US 10,042,939 B2
(45) Date of Patent: Aug. 7, 2018

(54) TECHNIQUES FOR PERSONALIZING EXPERTISE RELATED SEARCHES

(71) Applicant: Microsoft Technology Licensing, LLC, Redmond, WA (US)

(72) Inventors: Shakti Dhirendraji Sinha, Sunnyvale, CA (US); Viet-Ha Thuc, Mountain View, CA (US); Ganesh Venkataraman, San Jose, CA (US); Mario Sergio Rodriguez, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 629 days.

(21) Appl. No.: 14/529,541

(22) Filed: Oct. 31, 2014

(65) Prior Publication Data

US 2016/0124958 A1 May 5, 2016

(51) Int. Cl.
*G06F 17/30* (2006.01)
*G06Q 50/00* (2012.01)

(52) U.S. Cl.
CPC ....... *G06F 17/30867* (2013.01); *G06Q 50/01* (2013.01)

(58) Field of Classification Search
CPC .............................. G06F 17/30867
USPC .................................... 707/733
See application file for complete search history.

(56) References Cited

U.S. PATENT DOCUMENTS

| | | | | |
|---|---|---|---|---|
| 7,461,058 | B1* | 12/2008 | Rauser | G06Q 30/02 |
| 7,483,871 | B2* | 1/2009 | Herz | G06F 17/30867 |
| 8,166,026 | B1* | 4/2012 | Sadler | G06F 17/30867 707/722 |
| 8,296,179 | B1* | 10/2012 | Rennison | G06Q 30/0251 705/14.53 |
| 8,473,503 | B2 | 6/2013 | Cheng et al. | |
| 8,504,559 | B1* | 8/2013 | Elman | G06Q 30/08 705/321 |
| 8,650,177 | B2 | 2/2014 | Skomoroch et al. | |
| 8,935,263 | B1 | 1/2015 | Rodriguez et al. | |
| 9,449,080 | B1* | 9/2016 | Zhang | G06F 17/30657 |
| 2002/0133392 | A1* | 9/2002 | Angel | G06F 17/3089 705/7.39 |
| 2005/0055372 | A1* | 3/2005 | Springer, Jr. | G06F 17/30616 |
| 2008/0010226 | A1* | 1/2008 | Brinker | G06K 9/6284 706/12 |

(Continued)

*Primary Examiner* — Mark E Hershley
(74) *Attorney, Agent, or Firm* — Schwegman Lundberg & Woessner, P.A.

(57) ABSTRACT

Disclosed in some examples are methods, systems, and machine-readable mediums which provide for a personalized expertise searching. When a user of the social networking service enters a search query, the system determines if the user is searching for members who possess a particular skill. If the user is searching for members who possess a particular skill, the search results are post-processed by personalizing the search results using one or more machine-learning models which utilize one or more observed features about the user that enters the query, the skills of the members of the social networking service, and the query itself. In some examples, the system may utilize multiple machine-learning models in multiple passes to fine tune the relevance of the search results and to ensure that the post-processing returns search results in a timely manner.

20 Claims, 4 Drawing Sheets

(56) References Cited

U.S. PATENT DOCUMENTS

| | | | | |
|---|---|---|---|---|
| 2008/0270151 A1* | 10/2008 | Mahoney | ............... | G06Q 30/02 705/1.1 |
| 2008/0301118 A1* | 12/2008 | Chien | ............... | G06F 17/30873 |
| 2009/0164929 A1* | 6/2009 | Chen | ................. | G06F 17/30867 715/769 |
| 2009/0240680 A1* | 9/2009 | Tankovich | .......... | G06F 17/3053 |
| 2010/0161385 A1* | 6/2010 | Karypis | ................. | G06Q 10/04 705/7.31 |
| 2010/0306249 A1* | 12/2010 | Hill | ................... | G06F 17/30867 707/769 |
| 2012/0197733 A1 | 8/2012 | Skomoroch et al. | | |
| 2012/0197993 A1 | 8/2012 | Skomoroch et al. | | |
| 2013/0124538 A1* | 5/2013 | Lee | ..................... | G06F 17/3053 707/749 |
| 2013/0254213 A1* | 9/2013 | Cheng | ................. | G06Q 50/01 707/748 |
| 2013/0254305 A1* | 9/2013 | Cheng | ................. | H04L 51/32 709/206 |
| 2013/0318180 A1* | 11/2013 | Amin | ................... | H04L 65/403 709/206 |
| 2014/0143165 A1* | 5/2014 | Posse | ................ | G06Q 10/1053 705/319 |
| 2014/0156652 A1* | 6/2014 | Abiola | ................ | G06F 17/3053 707/723 |
| 2014/0214711 A1* | 7/2014 | Filstein | .................. | G06Q 10/06 705/321 |
| 2014/0244775 A1* | 8/2014 | Hull | ........................ | H04L 51/26 709/207 |
| 2014/0280214 A1* | 9/2014 | Han | ................... | G06F 17/30943 707/748 |
| 2014/0282098 A1* | 9/2014 | McConnell | ........ | G06Q 10/0639 715/753 |
| 2014/0372329 A1* | 12/2014 | Menon | ................. | G06Q 10/1053 705/319 |
| 2015/0095121 A1* | 4/2015 | Bastian | ............ | G06Q 10/06398 705/7.42 |
| 2015/0127565 A1* | 5/2015 | Chevalier | .............. | G06Q 10/00 705/319 |
| 2015/0310016 A1* | 10/2015 | Lamkhede | ........ | G06F 17/30737 707/706 |
| 2015/0347414 A1* | 12/2015 | Xiao | ................... | G06F 17/3053 707/749 |
| 2016/0034461 A1* | 2/2016 | Sundaram | ......... | G06F 17/30522 707/728 |
| 2016/0034583 A1* | 2/2016 | Agarwal | ............... | G06F 17/3053 707/706 |
| 2016/0124958 A1* | 5/2016 | Sinha | ............... | G06F 17/30867 707/733 |

* cited by examiner

TECHNIQUES FOR PERSONALIZING EXPERTISE RELATED SEARCHES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright LinkedIn, All Rights Reserved.

BACKGROUND

A social networking service is a computer or web-based service that enables users to establish links or connections with persons for the purpose of sharing information with one another. Some social network services aim to enable friends and family to communicate and share with one another, while others are specifically directed to business users with a goal of facilitating the establishment of professional networks and the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the following, a detailed description of examples will be given with references to the drawings. It should be understood that various modifications to the examples may be made. In particular, elements of one example may be combined and used in other examples to form new examples.

Many of the examples described herein are provided in the context of a social or business networking website or service. However, the applicability of the inventive subject matter is not limited to a social or business networking service. The present inventive subject matter is generally applicable to a wide range of information services.

A social networking service is a service provided by one or more computer systems accessible over a network that allows members of the service to build or reflect social networks or social relations among members. Typically, members construct profiles, which may include personal information such as the member's name, contact information, employment information, photographs, personal messages, status information, multimedia, links to web-related content, blogs, and so on. In order to build or reflect these social networks or social relations among members, the social networking service allows members to identify, and establish links or connections with other members. For instance, in the context of a business networking service (a type of social networking service), a person may establish a link or connection with his or her business contacts, including work colleagues, clients, customers, personal contacts, and so on. With a social networking service, a person may establish links or connections with his or her friends, family, or business contacts. While a social networking service and a business networking service may be generally described in terms of typical use cases (e.g., for personal and business networking respectively), it will be understood by one of ordinary skill in the art with the benefit of Applicant's disclosure that a business networking service may be used for personal purposes (e.g., connecting with friends, classmates, former classmates, and the like) as well as, or instead of business networking purposes and a social networking service may likewise be used for business networking purposes as well as or in place of social networking purposes. A connection may be formed using an invitation process in which one member "invites" a second member to form a link. The second member then has the option of accepting or declining the invitation.

In general, a connection or link represents or otherwise corresponds to an information access privilege, such that a first person who has established a connection with a second person is, via the establishment of that connection, authorizing the second person to view or access certain non-publicly available portions of their profiles that may include communications they have authored. Example communications may include blog posts, messages, "wall" postings, or the like. Of course, depending on the particular implementation of the business/social networking service, the nature and type of the information that may be shared, as well as the granularity with which the access privileges may be defined to protect certain types of data may vary.

Some social networking services may offer a subscription or following process to create a connection instead of, or in addition to the invitation process. A subscription or following model is where one member "follows" another member without the need for mutual agreement. Typically in this model, the follower is notified of public messages and other communications posted by the member that is followed. An example social networking service that follows this model is Twitter®—a micro-blogging service that allows members to follow other members without explicit permission. Other, connection based social networking services also may allow following type relationships as well. For example, the social networking service LinkedIn® allows members to follow particular companies.

Social networks may also provide various other features to their members. One example feature is the formation of skill communities through the identification of member skills (i.e., an area of expertise) based upon information in their profiles. The formation and use of such skill communities is described in U.S. patent application Ser. No. 13/357,171 filed on Jan. 24, 2012 to Skomoroch et. al and entitled "SKILL EXTRACTION SYSTEM," which is hereby incorporated by reference in its entirety, U.S. patent application Ser. No. 13/357,302 filed on Jan. 24, 2012 to Skomoroch et. al. and entitled "SKILL RANKING SYSTEM," which is hereby incorporated by reference in its entirety, and U.S. patent application Ser. No. 13/357,360 filed on Jan. 24, 2012 to Skomoroch et. al. and entitled "SKILL CUSTOMIZATION SYSTEM," which is hereby incorporated by reference in its entirety. The referenced documents describe a social networking system that is able to automatically build a standardized list of skills, allow members to tag themselves with particular skills (or automatically tag members with particular skills), rank members with particular skills relative to one another with respect to that skill, and customize a user's experience on the social networking service based upon their skills. Other skills related applications include U.S. patent application Ser. No. 14/216,821, filed on Mar. 17, 2014 to Rodriguez et al. and entitled "Generating Rankings of Reputation Scores in Reputation Systems," U.S. patent application Ser. No. 14/216,847, filed on Mar. 17, 2014 to Rodriguez et al. and entitled "Querying of Reputation Scores in Reputation Systems," U.S. patent application Ser. No. 14/216,797, filed on filed on Mar. 17, 2014 to Rodriguez et al. and entitled "Estimating Reputation Scores in Reputation Systems," which are hereby incorporated by reference in their entirety.

Searching for other members that possess particular skills may be valuable to members in order to fill job vacancies, find mentors, and find other members with similar skills. In some examples, skills may be a searchable text field in a member's profile. A user who is searching for members with a skill (a "searcher") may include the name of a skill or expertise in a general search box along with other terms. The search may be a full text search of the query terms against all terms in the member profile (including any skills). Profiles which contain the search query terms may be returned as matching profiles.

While this may help searchers find members who have particular skills, the results lack any context and thus the results may not be relevant to the searcher. For example, simply searching for users with a particular skill may turn up an enormous amount of results, depending on the skill. These search results may have no particular relation to the searcher and thus may be irrelevant to the searcher's motivation in searching for members with the particular skill. This tells a searcher relatively little other than that the member has a particular skill.

As already noted, the social networking service may rank each member according to an expertise level relative to all other members of the social networking service that possess that skill. Ranking factors may include the rankings in that particular skill of a member's connections, and the like. This ranking may be done using various machine learning algorithms as disclosed in U.S. patent application Ser. No. 13/357,302, for example. In order to increase the relevance of skill searches, in some examples, the results may be ordered based upon the respective member rank for the particular searched skill. As noted, the skill rankings calculated by the social networking service are global skill rankings and are not personalized to the context of the member who is searching. Thus, sorting by skill rankings may not provide a great amount of increased relevance. Moreover, searching for multiple skills presents difficulties in determining how to order the results as members will likely have different skill rankings for different skills.

Disclosed in some examples are methods, systems, and machine-readable mediums which provide a personalized expertise search system. When a user of the social networking service enters a search query, the system determines if the searcher is searching for members who possess a particular skill. If the searcher is searching for members who possess a particular skill, the search results are post-processed by personalizing the search results using one or more machine-learning models which utilize one or more observed features about: the searcher, the search results (e.g., information about skills of the search results such as skill rank), and the query itself. A feature may be one or more indicators that may be used to indicate relevance of a search result to a searcher and may be something that is determined, accessed, calculated, or otherwise obtained from, and describing a property of, the search query, the search result, or the searcher. In some examples, the system may utilize multiple machine-learning models in multiple passes to fine tune the relevance of the search results and to ensure that the post-processing returns search results in a timely manner.

Figure 1:
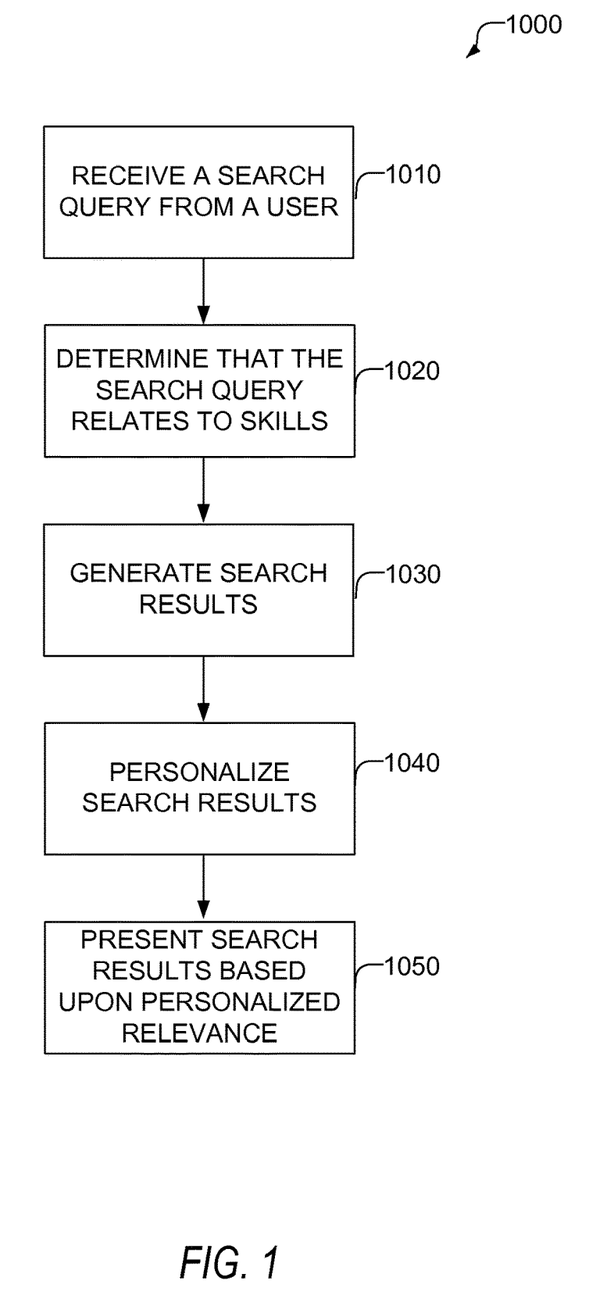
FIG. 1 is a flowchart of a method of providing personalized expertise search results according to some examples of the present disclosure.

Turning now to FIG. 1, a flowchart of a method of providing personalized expertise search results 1000 is shown according to some examples of the present disclosure. At operation 1010, the social networking service may receive a search query from a user. The search query may be entered in a search box of a graphical user interface provided by the social networking service. For example, the social networking service may provide one or more browser renderable objects such as one or more of a Hypertext Markup Language (HTML) document, a JavaScript document, an Extensible Markup Language (XML) document, and the like. These objects, when rendered by the browser, may provide the graphical user interface. In other examples, the graphical user interface may be provided by the social networking service in conjunction with a dedicated application executing on a searcher's computing device. For example, the social networking service may provide information that allows the application to present the graphical user interface on the application.

The search query may be entered by a searcher and may be transmitted from a computing device of the searcher to the social networking service over a computer network. The searcher may be a member of the social networking service and may have a corresponding member profile. The search query may comprise one or more search query terms and may be an unstructured search query (e.g., a string of query terms entered into a single query box). In other examples, the social networking service may offer an advanced search option where the user may specify the particular search query terms which apply to particular attributes of the member profiles. For example, the advanced search may have options to search one or more particular fields of the member profile such as "name," "company," "skills," and the like.

At operation 1020, the social networking service may determine that the search query relates to skills. If the searcher is utilizing advanced search functionality (e.g., a structured search), the system may determine that a skill is a search term by determining whether or not the user has entered any terms into a "skills" search box or otherwise designated a particular query term as a skill. For an unstructured search, the social networking service may map the search query terms into particular attributes (e.g., skills) based upon a machine-learning model and a shortest-pathfirst algorithm. This is described in U.S. Pat. No. 8,473,503 entitled "Method and system for semantic search against a document collection," and assigned to LinkedIn, the entirety of which is incorporated by reference herein. If the user is using an unstructured search, in some examples, the system may determine if any of the particular query keywords are skill keywords based upon the algorithms disclosed in the U.S. Pat. No. 8,473,503. In other examples, the system may utilize string matching to match query terms to terms corresponding to skills. The system may have a list of skills and one or more terms corresponding to those skills. When a search query term matches (e.g., through string matching algorithms) the skill or one of the terms corresponding to a skill, the system may determine that the search relates to that particular skill.

The social networking service may search the member profiles in a database of the social networking service at operation 1030 to generate a set of search results. The search results may be members of the social networking service that are returned by the social networking service's search engine as matching the search query. In some examples, the search engine may return member profiles that have at least one field that matches at least one of the query terms.

At operation 1040, the system may personalize the search results based upon one or more machine learning algorithms which take as input one or more features such as: how well the search query terms match the search results, information about the user submitting the search query (e.g., features about the searching user), or information about the members that make up the search results. The personalized search results may comprise an ordered subset of the set of search results determined at operation 1030. This subset may be determined and ordered based upon the output of the machine learning algorithm at operation 1040. At operation 1050, the personalized search results may be presented to the user. For example, the social networking service may provide one or more browser renderable objects such as one or more of a Hypertext Markup Language (HTML) document, a JavaScript document, an Extensible Markup Language (XML) document, and the like. In other examples, the graphical user interface may be provided by the social networking service in conjunction with a dedicated application executing on a searcher's computing device. For example, the social networking service may provide information that allows the application to present the graphical user interface on the application.

Figure 2:
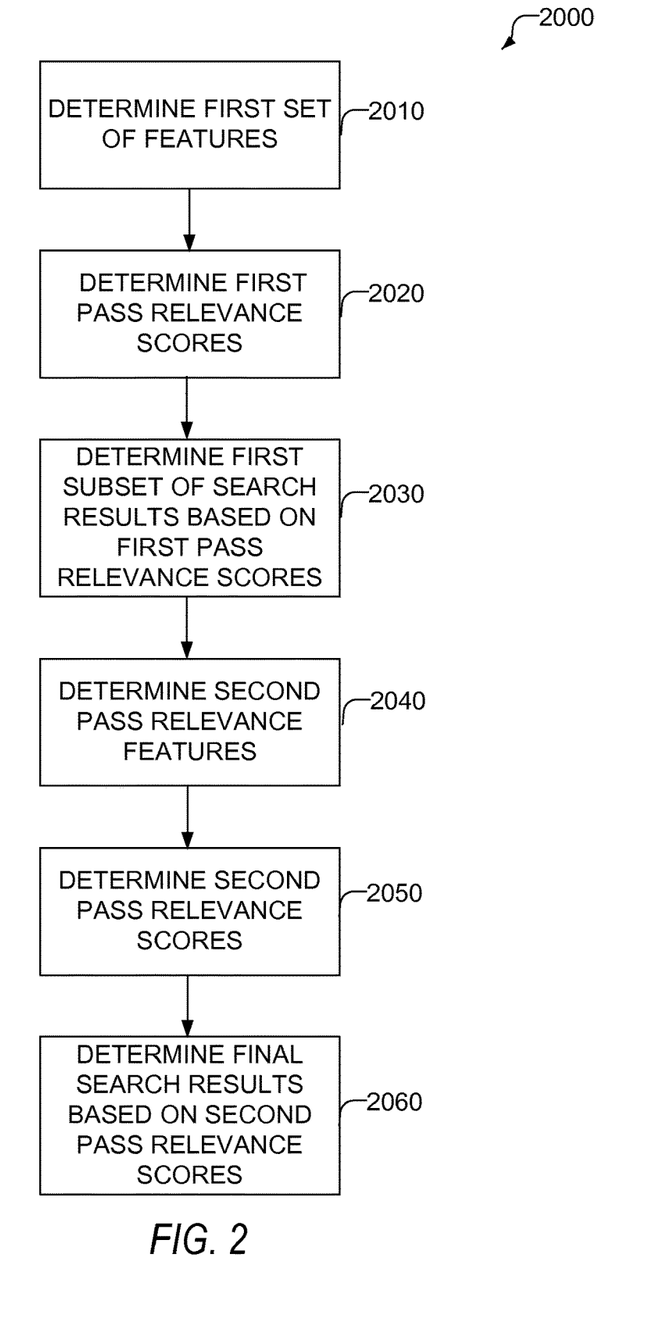
FIG. 2 is a flowchart of a method of personalizing a set of search results according to some examples of the present disclosure.

FIG. 2 is a flowchart of a method 2000 of personalizing a set of search results according to some examples of the present disclosure. At operation 2010, a first set of features are determined for one or more of the search results (in some examples, all the search results). A set of features may include one or more indicators of relevance to the searcher. Relevance may denote how well a retrieved search result meets the information needs of the user. Relevant results are both semantically relevant to the user's query as well as results that match well to the user's context. For example, when a user searches for people with a skill such as "machine learning" with the goal of finding job candidates, the user does not only want candidates with expertise on machine learning, but also wants candidates socially connected with the user and physically located in the same geographical area.

The features may be obtained from the member profiles of the search results, the member profile of the searcher, a calculation derived from comparisons of the member profile of the searcher and the member profiles of the search results, metrics quantifying the strength of the match between the search query and the search result, and the like. For example, if one of the features is a skill rating of a particular search result for a particular skill, determining the feature may include accessing the member profiles of each particular search result (or each particular one of the first subset of search results) to determine the skill rating of each member for that particular skill. Other examples include a feature based upon whether or not the searcher and the search result are in the same geographic area, have worked for a common company, have attended a common educational institution, or the like.

At operation 2020, the system may score each of the search results using the first set of features. The score may be an indication of how relevant the particular search result (i.e., the member) is to the searcher. The score may be computed using a machine learning algorithm that makes use of a pre-computed model. The model may be "learned" ahead of time using historical search results, corresponding historical feature indicators for those search results, the historical search query that generated those results, an indication of whether or not the search result was relevant to the search query, and the like. The model may be updated periodically using newly acquired training data, which may be taken from actual search data. Example machine learning algorithms may include neural networks, support vector machines, lambda MART, coordinate ascent learning to rank algorithm, and the like.

At operation 2030, the system may determine a first subset of the search results using the first pass relevance scores. For example, search results that are more relevant than a predetermined relevance threshold may be selected for the first subset of search results. In other examples, the most relevant predetermined number or percentage of the set of rough search results may be selected for inclusion in the first subset of search results.

At operation 2040, the second pass relevance features may be determined. The second pass relevance features may be different features than the first pass relevance features, or may include one or more common relevance features. In some examples, one or more of the second pass relevance features may require more computational effort to determine or to use in the model than the first pass relevance features. As such, doing these computations on a smaller subset of the search results may be reduce the overall computational load on the social networking service.

Determining the relevance features for the first and second passes may comprise accessing, calculating, or determining the data used as input into the first or second machine learning algorithm. This may comprise determining the relevance features for each search result for operation 2010 and for each search result in the first subset of search results for operation 2040.

At operation 2050 the first subset of search results may be scored based upon the second pass relevance features using a second machine learning algorithm. The models utilized by the first and second machine learning algorithms may be the same or different models. If the second model is different than the first model, the model may be built using the same or different training data. The machine learning algorithm used in the first pass and the second pass may be the same model, or a different model.

At operation 2060 the final set of search results may be determined based upon the second pass relevance scores. The final set of search results may comprise the search results from the first subset of search results that are more relevant than a predetermined relevance threshold. In other examples, the most relevant predetermined number or percentage of the first subset of search results may be selected for inclusion in the final search results. The final search results may be sorted based upon the second pass relevance scores (e.g., the most relevant result first, and the least relevant result last). In some examples, the final search results may be the same subset of search results as the first subset of search results, but sorted according to the second pass relevance scores. While FIG. 2 describes a two pass relevance method, a single pass relevance method may be utilized as well which utilizes the features of both the first and second passes.

The features used as the first pass and second pass relevance features may include features related to the search query and how well the terms in the search query match particular member profile fields. The features may also include features related to the search result. In some examples, the features may also include features related to the searcher.

For example, for the query based features, for each particular search field used in the scoring a number of query-based features may be calculated for each particular search result that is scored. Example search fields that may be used include the body, first name, last name, current company, past company, current title, and past title from the member profile of the search result. Example features calculated for each particular field include:

1. The number of terms in the query exactly matching the value in the particular field of the search result.
2. The number of terms in the query partially matching the value in the particular field of the search result.
3. The total frequency of the terms in the query matching the value in the particular field of the search result. For example a query such as "software google" where software matched 2 times in the body and google 1 time, the total frequency would have a value of three.
4. The number of terms explicitly tagged with a particular field exactly matching the particular field (e.g., in an advanced search, the user may specify the field for a term) of the search result.
5. The number of terms explicitly tagged with a particular field partially matching the particular field (e.g., in an advanced search, the user may specify the field for a term) of the search result.
6. Total frequency of terms explicitly tagged with a particular field partially matching the particular field (e.g., in an advanced search, the user may specify the field for a term) of the search result.

Other example features that may be determined for each particular search result may include:

1. The sum of skill reputation scores of the particular search result for skills that the user searched for. For example, if a user searches for "java"—the feature may be the particular search result's global skill rank for "java." If the user searches for "java" and "c++" this feature may be the sum of the particular search result's global skill rank for "java" and "c++." Other calculations for reputation scores may include those described in U.S. patent application Ser. No. 14/216,821, filed on Mar. 17, 2014 to Rodriguez et al. and entitled "Generating Rankings of Reputation Scores in Reputation Systems," U.S. patent application Ser. No. 14/216,847, filed on Mar. 17, 2014 to Rodriguez et al. and entitled "Querying of Reputation Scores in Reputation Systems," U.S. patent application Ser. No. 14/216,797, filed on Mar. 17, 2014 to Rodriguez et al. and entitled "Estimating Reputation Scores in Reputation Systems."

2. Whether the searcher and the particular search result are from the same geographical region. If the searcher and the particular search result are from the same geographical region, the search result is more likely to be relevant to the searcher as they are more likely to know the search result, or be interested in interacting with the search result.
3. A value (e.g., a Boolean value) representing whether the searcher and the particular search result are from the same country. If the searcher and the particular search result are from the same country, the search result is more likely to be relevant to the searcher as searchers tend to search for results in their same country.
4. A value (e.g., a Boolean value) representing whether the searcher and the particular search result are from the same industry. If the searcher and the particular search result are from the same industry, the search result is more likely to be relevant to the searcher as in many cases searchers are looking for individuals in the same industry.
5. The number of endorsements the particular search result received for the skills that the user searched for. Social networking services may allow for skill endorsements whereby one member indicates a positive affirmation that the endorsing member personally knows that the endorsee member possesses the endorsed skill. Members with high numbers of endorsements for a particular skill that the user is searching for indicate a higher likelihood that the member will actually know the skill and thereby be relevant to the user.
6. The network distance between the searcher and the search result. (e.g., 3 points for first degree, 2 points for $2^{nd}$ degree, 1 point if the searcher and the search result are in a shared group, 0 points if $3^{rd}$ degree or out of network). A connection degree may be calculated by representing members (e.g., the searcher and search result) and other entities (e.g., educational institutions, employers, and the like) as nodes in a graph and connections between members as edges of the graph. The degree is the number of edges between nodes along the shortest path between the members.
7. The connection strength between the searcher and the search result. A connection strength may be a score which reflects the overall strength (or relevance) of a path on the graph connecting the searcher with the search result. The edges of the social graph between nodes may be weighted to reflect the relationship between the nodes. For example, one weight may apply to two nodes who are members who are directly connected to each other. Another weight may reflect a connection between a member and an institution (such as a school or company). Another weight may reflect one member is following another member. Yet another weight may be based upon messages or other communications exchanged between the nodes. The connection strength in some examples may be the largest sum of the edge weights of all paths between two nodes.
8. If a result is an influencer member, the feature value may be 1, otherwise the feature value is 0. This feature boosts results matching the query who are influencer members. Influencer members are top industry leaders who submit content for the social networking service and whom may be selected by individuals or algorithms in the social networking service.
9. The number of days since the profile of the search result was registered. A member search result that has a newly registered profile may be considered less relevant as the member profile may not be as complete as someone who has been a member longer.

10. The number of days since the profile of the search result was modified. Newly modified profiles may be a signal that the member search result is more active on the social networking service and may be more relevant.

11. The maximum number of days the search result has been in the same company. A small number of days may indicate a propensity that the search result may leave their current company and may increase relevance of the search result for searchers who are seeking job candidates.

12. The maximum number of days the search result has been in the same position. A small number of days may indicate a propensity that the search result may leave their current position and may increase relevance of the search result for searchers who are seeking job candidates.

13. The total work experience of the search result (in days). A member with more work experience is likely to be more relevant than a member with less work experience as they are likely more experienced, and thus the searcher is more likely to personally know them, and more likely to want to interact with them.

14. If the member search result matches both a first and last name. In some examples this feature may be a Boolean value. If both the first and last name of a member matches terms in the search query this would be a sign of increased relevance.

15. A profile quality score. The higher the particular search result's profile quality score the higher the relevance of the particular member. A low quality profile may not be as relevant to a searcher. A profile quality score may be calculated based upon how complete the member profile is. For example, certain fields of the member profile may be assigned point values. The member's profile quality score may be the sum of all the point values for all fields that the member has completed. This feature may filter out profiles that may be considered "spam," which are low quality profiles that utilize keyword stuffing, repeated positions, and other un-relevant results.

16. Number of Connections. The more connections that the particular search result has, the more likely the member is relevant to the user that submitted the search query. A member with more connections is likely to be more connected to other members and is likely more prominent in a skill community and thus more likely to be relevant to the searcher.

17. A value (e.g., a Boolean value) representing whether the searcher and the search result currently work at the same company. If the searcher and the particular search result are currently at the same company, the relevance of the particular member search result increases as it is more likely the searcher will want to interact with the search result as they share a common characteristic.

18. A value (e.g., a Boolean value) representing whether there is any past common employment history. If the searcher and the particular search result worked at one or more of the same companies, the relevance of the particular member search result increases as it is more likely the searcher will want to interact with the search result as they share a common characteristic.

19. A value (e.g., a Boolean value) representing whether there are any common educational institutions the searcher and the search result have attended. If the searcher and the particular search result attended one or more of the same schools, the relevance of the particular member search result increases as it is more likely the searcher will want to interact with the search result as they share a common characteristic.

20. Number of groups that overlap. If the searcher and the particular search result are members of one or more groups on the social networking service, the relevance of the particular member search result increases as it is more likely the searcher will want to interact with the search result as they share a common characteristic (e.g., common group).

21. Number of shared connections. If the searcher and the particular search result have one or more common connections, the relevance of the particular member search result increases as it is more likely the searcher will want to interact with the search result as they share a common characteristic.

The features discussed above may be weighted. For example, certain features have a better predictive value on the relevance of a search result. These may be given a greater weight than features that have a lesser predictive value. In other examples, the weights to assign each particular feature may be determined as part of training the model (e.g., a neural network). Finally, while machine learning algorithms have been discussed, in other examples, the relevance score may simply be the sum of the individual weighted feature scores.

In some examples, certain models, such as a tree model, may make use of additional features which describe the query. For example, whether the query included a first name, last name, company, title, or whether the query was an advanced search. For example, if the query has a first name, the tree model might decide to turn into a branch that is specific for these types of queries. Similarly if a query contains title, the model might decide to get into a branch for title queries.

Figure 3:
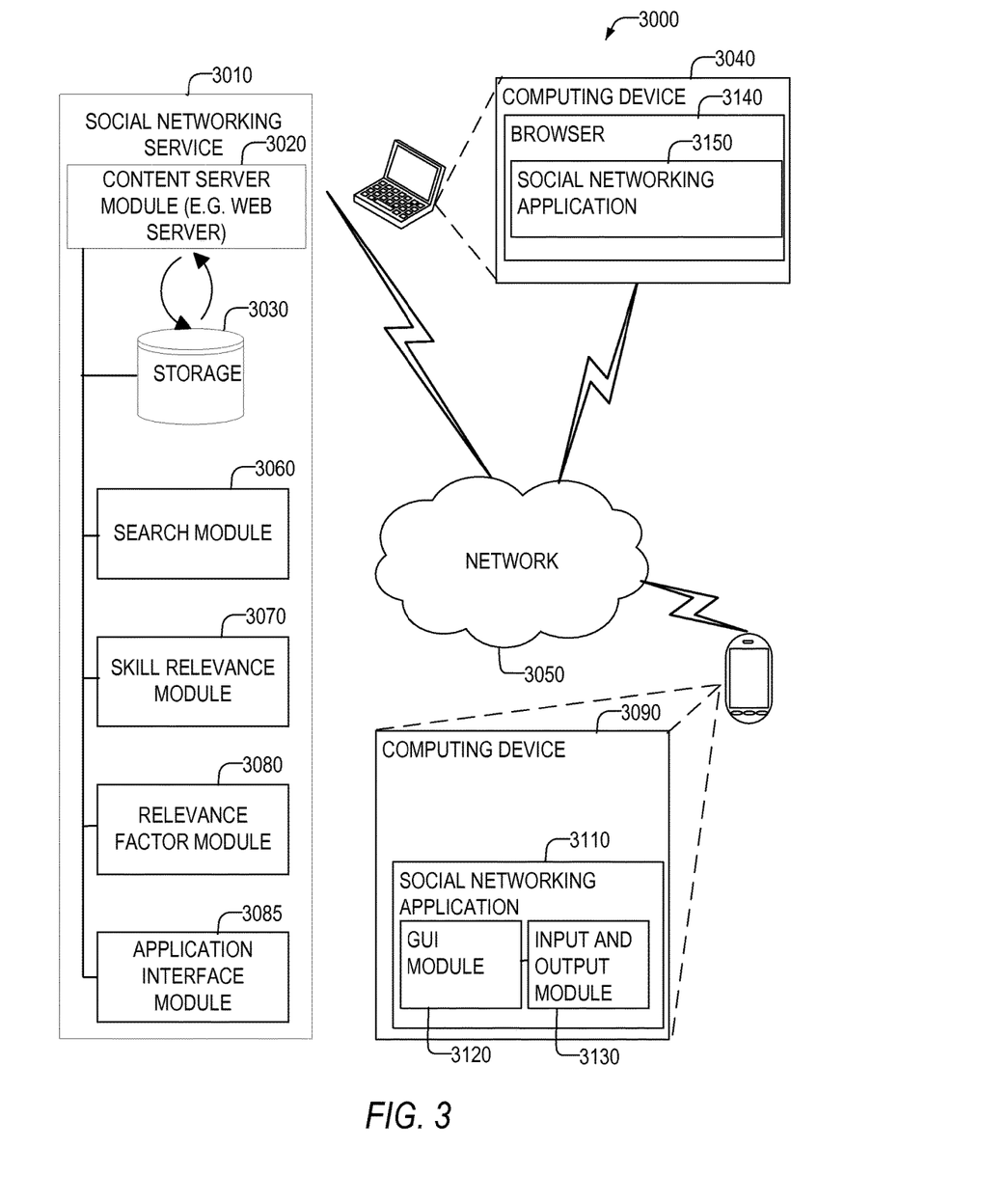
FIG. 3 shows a diagram of a social network system according to some examples of the present disclosure.

FIG. 3 shows a diagram of a social network system 3000 according to some examples of the present disclosure. Social networking service 3010 may contain a content server module 3020. Content server module 3020 may communicate with storage 3030, search module 3060, skill relevance module 3070, relevance factor module 3080, application interface module 3085, and may communicate with one or more computing devices 3040 and 3090 through a network 3050. Content server module 3020 may be responsible for the retrieval, presentation, and maintenance of member profiles stored in storage 3030 as well as the retrieval, creation, and presentation of a user interface for users. Content server module 3020, in one example, may include or be a web server that fetches or creates internet web pages. Web pages may be or include Hyper Text Markup Language (HTML), eXtensible Markup Language (XML), JavaScript, or the like. The web pages may include portions of, or all of, a member profile at the request of users of computing devices 3040 or 3090. The content server module 3020 may also be responsible for allowing members to communicate with one another, establish connections, and post multimedia files (e.g., pictures, videos, and the like).

Content server module 3020 may provide one or more graphical user interfaces with search functionality to computing devices 3090 and 3040. For example, content server module 3020 may provide a basic or advanced graphical search form for users of computing devices 3090 or 3040 to input a search query. A search query entered into the interface provided by the content server module 3020 may then be transmitted to the social networking service 3010 over network 3050 to content server module 3020. Content server module 3020 may then submit the received search query to the search module 3060. Search module 3060 may search storage 3030 for member profiles of members that match the search query. Search module 3060 may pass raw search results of the query to the skill relevance module 3070 if the search module 3060 detects that the search query is related to skills. Skill relevance module 3070 may execute one or more of the operations of FIG. 2 to determine an ordered list of search results prioritized by relevance to the searcher and the query. The skill relevance module 3070 may utilize one or more features from the relevance factor module 3080 in conjunction with a machine-learning model created by the skill relevance module 3070. Relevance factor module 3080 may determine one or more relevance features by accessing storage 3030. Once the relevance of the search results are determined, the skill relevance module 3070 may determine the final search results. The skill relevance module 3070 may then work with content server module 3020 or application interface module 3085 to create a graphical user interface display of the search results for presentation on computing devices 3090 or 3040. As content server module 3020 and application interface module 3085 may both communicate over network 3050 with computing device 3090 and 3040, these modules may also be referred to as input and output modules. Social networking service 3010 and the modules described therein may execute on one or more computing devices (e.g., as described in FIG. 4) and may operate automatically in response to appropriate inputs and without human intervention.

Users of computing devices 3040 and 3090 may include one or more members, prospective members, or other users of the social networking service 3010. Computing devices 3040 and 3090 communicate with social networking service 3010 through a network 3050. The network 3050 may be any means of enabling the social networking service 3010 to communicate data with computing devices 3040, 3090. Example networks 3050 may be or include portions of one or more of: the Internet, a Local Area Network (LAN), a Wide Area Network (WAN), wireless network (such as a wireless network based upon an IEEE 802.11 family of standards), a Metropolitan Area Network (MAN), a cellular network, or the like.

Computing device 3040 may be a laptop, desktop, tablet, cellphone or any other computing device which may provide a social networking application 3150 in conjunction with browser 3140. Social networking application 3150 may be one or more of hypertext markup language (HTML), javaScript, Java, or other browser executable objects that are executed within the browser 3140 to provide social networking functionality to a user. The social networking application 3150 may be deployed to the computing device 3040 by content server module 3020 through interaction with browser 3140.

Computing device 3090 may be a laptop, desktop, tablet, cellphone, or any other computing device which may provide a social networking functionality to the user through execution of a social networking application 3110. Social networking application 3110 may include a graphical user interface (GUI) module 3120 which may provide a graphical user interface output to a display which may show social networking information, provide a graphical search interface, show search results, and the like. Input and output module 3130 may accept input, such as a search query, and process it in order to update the graphical user interface provided by the GUI module 3120. Input and output module 3130 may interface with the social networking service 3010 through the content server module 3020 or the application interface module 3085 using one or more application programming interfaces (APIs). Input and output module 3130 may send information and requests to social networking service 3010 through application interface module 3085. For example, search queries, login information, user selections, and the like. Input and output module 3130 may receive data related to the social networking service 3010 (e.g., member profile information, GUI information, search results, and other data) by interfacing with application interface module 3085 through one or more application programming interfaces (APIs).

Both social networking applications 3150 and 3110 may provide social networking functionality to users in conjunction with content server module 3020 and application interface module 3085, and in some examples in conjunction with storage 3030 and search module 3060, skill relevance module 3070, and relevance factor module 3080. Social networking functionality may include viewing, editing, or deleting information in member profiles, communicating with other members, adding or removing skills, searching, and the like.

Figure 4:
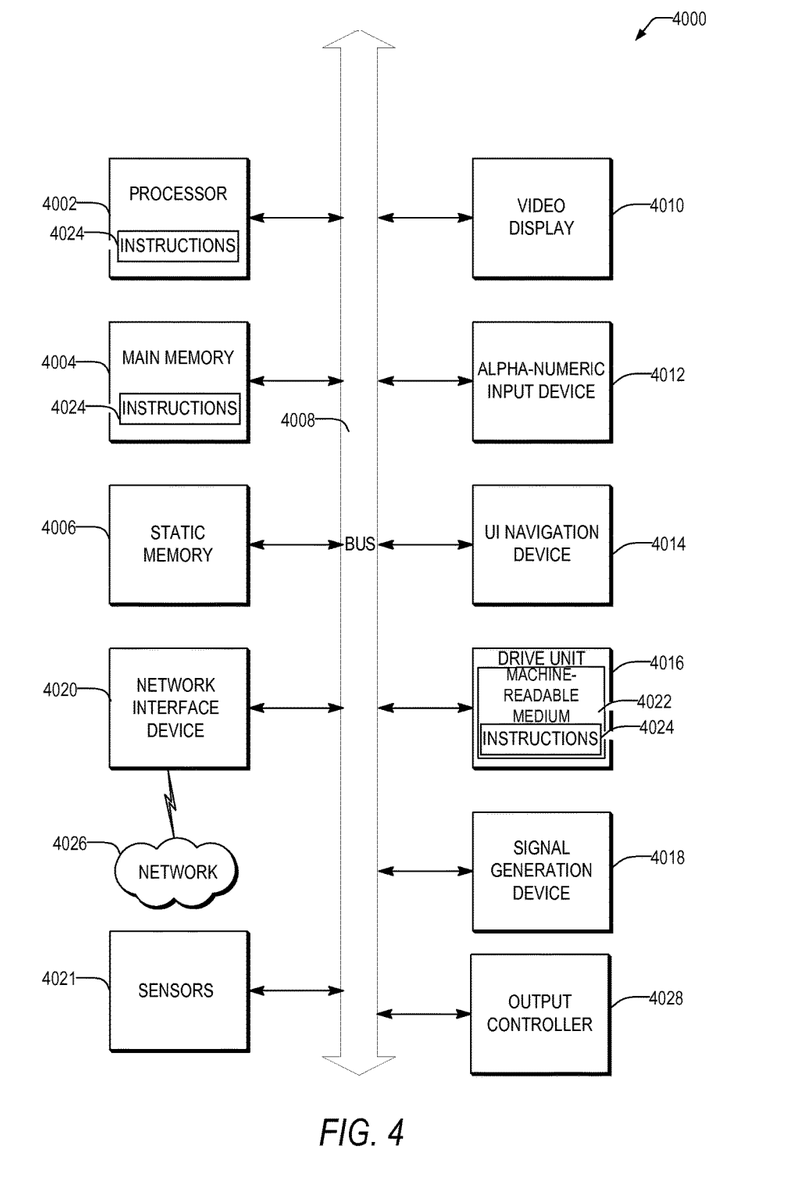
FIG. 4 is a block diagram illustrating an example of a machine upon which one or more embodiments may be implemented.

FIG. 4 illustrates a block diagram of an example machine 4000 upon which any one or more of the techniques (e.g., methodologies) discussed herein may perform. The components of FIG. 3 (e.g., computing devices 3090, social networking service 3010, computing device 3040 or portions of network 3050) may execute upon and/or include one or more of the components in FIG. 4. In alternative embodiments, the machine 4000 may operate as a standalone device or may be connected (e.g., networked) to other machines. In a networked deployment, the machine 4000 may operate in the capacity of a server machine, a client machine, or both in server-client network environments. In an example, the machine 4000 may act as a peer machine in a peer-to-peer (P2P) (or other distributed) network environment. The machine 4000 may be a server, personal computer (PC), a tablet PC, a set-top box (STB), a personal digital assistant (PDA), a mobile telephone, a smart phone, a wearable computing device, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time. A machine with a general purpose hardware processor is thus transformed into a special purpose machine once configured and programmed to perform the operations of one or more modules.

Machine (e.g., computer system) 4000 may include a hardware processor 4002 (e.g., a central processing unit (CPU), a graphics processing unit (GPU), a hardware processor core, or any combination thereof), a main memory 4004 and a static memory 4006, some or all of which may communicate with each other via an interlink (e.g., bus) 4008. The machine 4000 may further include a display unit 4010, an alphanumeric input device 4012 (e.g., a keyboard), and a user interface (UI) navigation device 4014 (e.g., a mouse). In an example, the display unit 4010, input device 4012 and UI navigation device 4014 may be a touch screen display. The machine 4000 may additionally include a storage device (e.g., drive unit) 4016, a signal generation device 4018 (e.g., a speaker), a network interface device 4020, and one or more sensors 4021, such as a global positioning system (GPS) sensor, compass, accelerometer, or other sensor. The machine 4000 may include an output controller 4028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 4016 may include a machine readable medium 4022 on which is stored one or more sets of data structures or instructions 4024 (e.g., software) embodying or utilized by any one or more of the techniques or functions described herein. The instructions 4024 may also reside, completely or at least partially, within the main memory 4004, within static memory 4006, or within the hardware processor 4002 during execution thereof by the machine 4000. In an example, one or any combination of the hardware processor 4002, the main memory 4004, the static memory 4006, or the storage device 4016 may constitute machine readable media.

While the machine readable medium 4022 is illustrated as a single medium, the term "machine readable medium" may include a single medium or multiple media (e.g., a centralized or distributed database, and/or associated caches and servers) configured to store the one or more instructions 4024.

The term "machine readable medium" may include any medium that is capable of storing, encoding, or carrying instructions for execution by the machine 4000 and that cause the machine 4000 to perform any one or more of the techniques of the present disclosure, or that is capable of storing, encoding, or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 4024 may further be transmitted or received over a communications network 4026 using a transmission medium via the network interface device 4020. The Machine 4000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 4020 may include one or more physical jacks (e.g., Ethernet, coaxial, or phone jacks) or one or more antennas to connect to the communications network 4026. In an example, the network interface device 4020 may include a plurality of antennas to wirelessly communicate using at least one of single-input multiple-output (SIMO), multiple-input multiple-output (MIMO), or multiple-input single-output (MISO) techniques. In some examples, the network interface device 4020 may wirelessly communicate using Multiple User MIMO techniques.

NOTES AND EXAMPLES

The following are non-limiting examples.

Example 1 includes subject matter (such as a method, means for performing acts, machine readable medium including instructions that when performed by a machine cause the machine to performs acts, or an apparatus to perform) comprising: using one or more computer processors to perform the operations of: receiving a query from a computing device over a computer network submitted by a user via a search input in a first graphical user interface; responsive to receiving the query, automatically: finding in a database of a social networking service a first set of member profiles that match one or more keywords in the query; determining that a keyword in the query is a skill keyword that corresponds to a skill; responsive to determining that a keyword in the query is the skill keyword: determining relevance scores for respective profiles of one or more of a first set of member profiles, the relevance scores calculated using a relevance model, inputs to the relevance model comprising: a first feature of the user, the one or more keywords, and a skill rating of the skill for a member of the social networking service corresponding to the respective member profile; and providing to the computing device for display on the computing device, information about a plurality of the member profiles that is sorted according to the respective relevance scores.

In Example 2, the subject matter of Example 1 may include, wherein the relevance scores are calculated for all profiles in the first set of member profiles.

In Example 3, the subject matter of any one of Examples 1 to 2 may include, wherein the method comprises: selecting the respective member profiles to calculate the relevance scores for by scoring each of the plurality of member profiles in the first set of member profiles using a second relevance model, the inputs to the second relevance model including the one or more keywords; and selecting member profiles in the first set of member profiles for scoring using the relevance model whose score is above a predetermined threshold.

In Example 4, the subject matter of any one of Examples 1 to 3 may include, determining that a second keyword in the query is a skill keyword that corresponds to a second skill; responsive to determining that a second keyword in the query is a skill keyword utilizing a combined skill rating for the first skill and the second skill as input into the relevance model.

In Example 5, the subject matter of any one of Examples 1 to 4 may include, providing a first graphical user interface comprising the search input to the computing device and wherein providing information about the plurality of the member profiles sorted according to the respective relevance scores comprises providing a second graphical user interface comprising the information about the plurality of the member profiles sorted according to the respective relevance scores.

In Example 6, the subject matter of any one of Examples 1 to 5 may include, wherein the relevance model is a neural network.

In Example 7, the subject matter of any one of Examples 1 to 6 may include, wherein determining that a keyword in the query is a skill keyword that corresponds to the skill comprises determining that the keyword matches a term corresponding to the skill by string matching.

In Example 8, the subject matter of any one of Examples 1 to 7 may include, wherein the feature of the user is a social network distance between the user and the member of the social networking service corresponding to the respective member profile.

In Example 9, the subject matter of any one of Examples 1 to 8 may include, wherein the input to the relevance model includes the number of endorsements for the first skill the member of the social networking service corresponding to the respective member profile has.

In Example 10, the subject matter of any one of Examples 1 to 9 may include, wherein the input to the relevance model includes an indicator of a common employer between the user and the member of the social networking service corresponding to the respective member profile.

In Example 11, the subject matter of any one of Examples 1 to 10 may include, wherein the input to the relevance model includes an indicator of a common educational institution between the user and the member of the social networking service corresponding to the respective member profile.

Example 12 includes subject matter (such as a device, apparatus, or machine) comprising: an input and output module configured to receive a query from a computing device over a computer network submitted by a user via a search input in a first graphical user interface; a search module configured to, automatically, responsive to the input module receiving the query: find in a database of a social networking service a first set of member profiles that match one or more keywords in the query; determine that a keyword in the query is a skill keyword that corresponds to a skill; and a skill relevance module configured to: responsive to the search module determining that a keyword in the query is the skill keyword: determine relevance scores for respective profiles of one or more of a first set of member profiles, the relevance scores calculated using a relevance model, inputs to the relevance model comprising: a first feature of the user, the one or more keywords, and a skill rating of the skill for a member of the social networking service corresponding to the respective member profile; and provide to the computing device for display on the computing device, information about a plurality of the member profiles that is sorted according to the respective relevance scores.

In Example 13, the subject matter of Example 12 may include, wherein the skill relevance module is configured to calculate relevance scores for all profiles in the first set of member profiles.

In Example 14, the subject matter of any one of Examples 12 to 13 may include, wherein the skill relevance module is configured to: select the respective member profiles to calculate the relevance scores for by scoring each of the plurality of member profiles in the first set of member profiles using a second relevance model, the inputs to the second relevance model including the one or more keywords; and select member profiles in the first set of member profiles for scoring using the relevance model whose score is above a predetermined threshold.

In Example 15, the subject matter of any one of Examples 12 to 14 may include, wherein the search module is configured to: determine that a second keyword in the query is a skill keyword that corresponds to a second skill; and wherein the skill relevance module is configured to utilize a combined skill rating for the first skill and the second skill as input into the relevance model responsive to the search module determining that a second keyword in the query is a skill keyword.

In Example 16, the subject matter of any one of Examples 12 to 15 may include, wherein the input and output module is configured to provide a first graphical user interface comprising the search input to the computing device and wherein the input and output module is configured to provide a second graphical user interface comprising the information about the plurality of the member profiles sorted according to the respective relevance scores.

In Example 17, the subject matter of any one of Examples 12 to 16 may include, wherein the relevance model is a neural network.

In Example 18, the subject matter of any one of Examples 12 to 17 may include, wherein the search module is configured to determine that a keyword in the query is a skill keyword that corresponds to the skill by being configured to determine that the keyword matches a term corresponding to the skill by string matching.

In Example 19, the subject matter of any one of Examples 12 to 18 may include, wherein the feature of the user is a social network distance between the user and the member of the social networking service corresponding to the respective member profile.

In Example 20, the subject matter of any one of Examples 12 to 19 may include, wherein the input to the relevance model includes the number of endorsements for the first skill the member of the social networking service corresponding to the respective member profile has.

In Example 21, the subject matter of any one of Examples 12 to 20 may include, wherein the input to the relevance model includes an indicator of a common employer between the user and the member of the social networking service corresponding to the respective member profile.

In Example 22, the subject matter of any one of Examples 12 to 21 may include, wherein the input to the relevance model includes an indicator of a common educational institution between the user and the member of the social networking service corresponding to the respective member profile.

What is claimed is:

1. A method comprising:
using one or more computer processors to perform operations of:
receiving a query from a computing device over a computer network submitted by a searching user via a search input in a first graphical user interface;
responsive to receiving the query, automatically:
finding in a database of a social networking service a first set of matching member profiles that match one or more keywords in the query;
determining that a keyword in the query is a skill keyword that corresponds to a skill;
responsive to determining that a keyword in the query is the skill keyword:
determining first relevance scores for respective member profiles of the first set of matching member profiles, the first relevance scores reflecting a rough estimate of relevance of the respective profile to a context of the searching user and calculated using a first machine-learned, supervised learning relevance model and a first set of features;
selecting a second set of member profiles comprising member profiles of the first set of matching profiles that have corresponding relevance scores above a predetermined threshold;
determining second relevance scores for respective member profiles for the second set of member profiles, the second relevance scores reflecting a refined relevance of the respective profile to a context of the searching user and calculated using a second machine-learned supervised relevance model using a second set of features different from the first set of features, the second machine-learned supervised relevance model being more computationally expensive than the first machine-learned supervised relevance model;
providing to the computing device for display on the computing device in a second graphical user interface, information about a plurality of the second set of member profiles that is sorted according to the second relevance scores; and
wherein the first and second set of features comprise one or more of: features of the searching user obtained from a member profile of the searching user, one or more keywords from the query, a comparison result of a comparison between an item on the member profile of the searching user and an item on the respective member profiles, and a skill rating of the skill for the respective member profile.

2. The method of claim 1, wherein the first relevance scores are calculated for all profiles in the first set of matching member profiles.

3. The method of claim 1, comprising:
determining that a second keyword in the query is a skill keyword that corresponds to a second skill; and
responsive to determining that a second keyword in the query is a skill keyword utilizing a combined skill rating for the skill and the second skill as input into the first relevance model.

4. The method of claim 1, wherein determining that a keyword in the query is a skill keyword that corresponds to the skill comprises determining that the keyword matches a term corresponding to the skill by string matching.

5. The method of claim 1, wherein features of the searching user comprise a social network distance between the searching user and a member of the social networking service corresponding to the respective member profile.

6. The method of claim 1, wherein the features comprise a number of endorsements for the skill that a member of the social networking service corresponding to the respective member profile has.

7. A social networking system comprising:
a processor;
a memory, comprising instructions, that when executed by the processor, causes the processor to perform operations comprising:
receiving a query from a computing device over a computer network submitted by a searching user via a search input in a first graphical user interface;
responsive to receiving the query, automatically:
finding in a database of a social networking service a first set of matching member profiles that match one or more keywords in the query;
determining that a keyword in the query is a skill keyword that corresponds to a skill;
responsive to determining that a keyword in the query is the skill keyword:
determining first relevance scores for respective member profiles of the first set of matching member profiles, the first relevance scores reflecting a rough estimate of relevance of the respective profile to a context of the searching user and calculated using a first machine-learned, supervised learning relevance model and a first set of features;
selecting a second set of member profiles comprising member profiles of the first set of matching profiles that have corresponding relevance scores above a predetermined threshold;
determining second relevance scores for respective member profiles for the second set of member profiles, the second relevance scores reflecting a refined relevance of the respective profile to a context of the searching user and calculated using a second machine-learned supervised relevance model using a second set of features different from the first set of features, the second machine-learned supervised relevance model being more computationally expensive than the first machine-learned supervised relevance model;
providing to the computing device for display on the computing device in a second graphical user interface, information about a plurality of the second set of member profiles that is sorted according to the second relevance scores; and
wherein the first and second set of features comprise one or more of: features of the searching user obtained from a member profile of the searching user, one or more keywords from the query, a comparison result of a comparison between an item on the member profile of the searching user and an item on the respective member profiles, and a skill rating of the skill for the respective member profile.

8. The system of claim 7, wherein the operations further comprise:
determining that a second keyword in the query is a skill keyword that corresponds to a second skill; and
responsive to determining that the second keyword in the query is a skill keyword, utilizing a combined skill rating for the skill and the second skill as input into the first relevance model.

9. The system of claim 7, wherein the first relevance model is a neural network.

10. The system of claim 7, wherein features of the searching user comprise a social network distance between the searching user and a member of the social networking service corresponding to the respective member profile.

11. The system of claim 7, wherein the features comprise a number of endorsements for the skill that a member of the social networking service corresponding to the respective member profile has.

12. The system of claim 7, wherein the features comprise an indicator of a common employer between the searching user and a member of the social networking service corresponding to the respective member profile.

13. The system of claim 7, wherein the features comprise an indicator of a common educational institution between the searching user and member of the social networking service corresponding to the respective member profile.

14. A non-transitory machine-readable medium that stores instructions which when performed by a machine, cause the machine to perform operations comprising:
using one or more computer processors to perform the operations of:
receiving a query from a computing device over a computer network submitted by a searching user via a search input in a first graphical user interface;
responsive to receiving the query, automatically:
finding in a database of a social networking service a first set of matching member profiles that match one or more keywords in the query;
determining that a keyword in the query is a skill keyword that corresponds to a skill;
responsive to determining that a keyword in the query is the skill keyword:
determining first relevance scores for respective member profiles of one or more of the first set of matching member profiles, the first relevance scores reflecting a rough estimate of relevance of the respective profile to a context of the searching user and calculated using a first machine-learned, supervised learning relevance model and a first set of features;
selecting a second set of member profiles comprising the members profiles of the first set of matching profiles that have corresponding relevance scores above a predetermined threshold;
determining second relevance scores for respective member profiles for the second set of member profiles, the second relevance scores reflecting a refined relevance of the respective profile to a context of the searching user and calculated using a second machine-learned supervised relevance model using a second set of features different from the first set of features, the second machine-learned supervised relevance model being more computationally expensive than the first machine-learned supervised relevance model;
providing to the computing device for display on the computing device in a second graphical user interface, information about a plurality of the second set of member profiles that is sorted according to the second relevance scores; and
wherein the first and second set of features comprise one or more of: features of the searching user obtained from a member profile of the searching user, one or more keywords from the query, a comparison result of a comparison between an item on the member profile of the searching user and an item on the respective member profiles, and a skill rating of the skill for the respective member profile.

15. The machine-readable medium of claim 14, wherein the operations comprise:
determining that a second keyword in the query is a skill keyword that corresponds to a second skill; and
responsive to determining that a second keyword in the query is a skill keyword utilizing a combined skill rating for the skill and the second skill as input into the first relevance model.

16. The machine-readable medium of claim 14, wherein the operations for determining that a keyword in the query is a skill keyword that corresponds to the skill comprises determining that the keyword matches a term corresponding to the skill by string matching.

17. The machine-readable medium of claim 14, wherein the first feature of the searching user is a social network distance between the searching user and the member of the social networking service corresponding to the respective member profile.

18. The machine-readable medium of claim 14, wherein the input to the first relevance model includes a number of endorsements for the skill that the member of the social networking service corresponding to the respective member profile has.

19. The machine-readable medium of claim 14, wherein the input to the first relevance model includes an indicator of a common employer between the searching user and the member of the social networking service corresponding to the respective member profile.

20. The machine-readable medium of claim 14, wherein the input to the first relevance model includes an indicator of a common educational institution between the searching user and the member of the social networking service corresponding to the respective member profile.

* * * * *

UNITED STATES PATENT AND TRADEMARK OFFICE
CERTIFICATE OF CORRECTION

PATENT NO. : 10,042,939 B2
APPLICATION NO. : 14/529541
DATED : August 7, 2018
INVENTOR(S) : Sinha et al.

Page 1 of 1

It is certified that error appears in the above-identified patent and that said Letters Patent is hereby corrected as shown below:

In the Claims

In Column 19, Line 31, in Claim 13, after "and", insert --a--

Signed and Sealed this
Twentieth Day of August, 2019

Andrei Iancu
*Director of the United States Patent and Trademark Office*